United States Patent [19]
Rahman et al.

[11] Patent Number: 6,032,613
[45] Date of Patent: Mar. 7, 2000

[54] BIOLOGICAL TREATMENT SYSTEM FOR GASEOUS WASTE

[75] Inventors: Matiur Rahman, Champaign, Ill.; Mark D. Reeves, Perrysville, Ind.

[73] Assignee: Teepak Investment, Inc., Wilmington, Del.

[21] Appl. No.: 09/048,514

[22] Filed: Mar. 26, 1998

[51] Int. Cl.[7] .................................................. A01K 63/00
[52] U.S. Cl. .............................................................. 119/231
[58] Field of Search .................................... 119/231, 243, 119/259, 260, 268

[56] References Cited

U.S. PATENT DOCUMENTS

| | | | |
|---|---|---|---|
| 4,043,299 | 8/1977 | Birkbeck et al. | 119/215 |
| 4,880,542 | 11/1989 | Sublette | 210/611 |
| 4,968,622 | 11/1990 | Berzaczy et al. | 435/266 |
| 4,997,934 | 3/1991 | Rahman | 536/30 |
| 5,087,353 | 2/1992 | Todd et al. | 210/94 |
| 5,236,677 | 8/1993 | Torres-Cardona et al. | 423/230 |
| 5,732,654 | 3/1998 | Perez et al. | 119/204 |
| 5,746,155 | 5/1998 | Logan et al. | 119/230 |
| 5,820,759 | 10/1998 | Stewart et al. | 119/225 |
| 5,947,057 | 9/1999 | Perez et al. | 119/211 |

FOREIGN PATENT DOCUMENTS 0 237 091 2/1987 European Pat. Off. .
8107927 4/1996 Japan .

OTHER PUBLICATIONS

Bergy's Manual of Systematic Bacteriology, 4th edition, vol. 3, 1989, pp. 1834–1862.
W. Vishniac et al., Bacteriol. Rev. vol. 21, pp. 195–213, 1957.
Buisman et al., Acta Biotechnol. vol. 9, pp. 255–267, 1989.
Buisman et al., Biotechnol. Bioengg. vol. 35, pp. 50–56, 1990.
Buisman et al., Wat. Res. vol. 24, No. 5, pp. 667–671, 1990.
Sublette et al., Biotechnol. Bioengg. vol. 37, pp. 497–504, 1991.

*Primary Examiner*—Thomas Price
*Attorney, Agent, or Firm*—Michael L. Dunn

[57] ABSTRACT

A biological treatment system for removal of gaseous waste materials. The system comprises a column containing microorganisms which break down components of the waste materials; a pond in series with the column containing life forms in addition to the microorganisms in the column, which life forms provide essential nutrients for the microorganisms in the column; a treatment bed containing a reaction medium for removing undesirable biological metabolic by-products from the action of said microorganisms upon the gaseous waste materials; a fluid distribution means for circulating water between the pond, column and bed and a means for delivering gaseous waste materials through the column before such gaseous waste materials reach the pond.

25 Claims, 1 Drawing Sheet

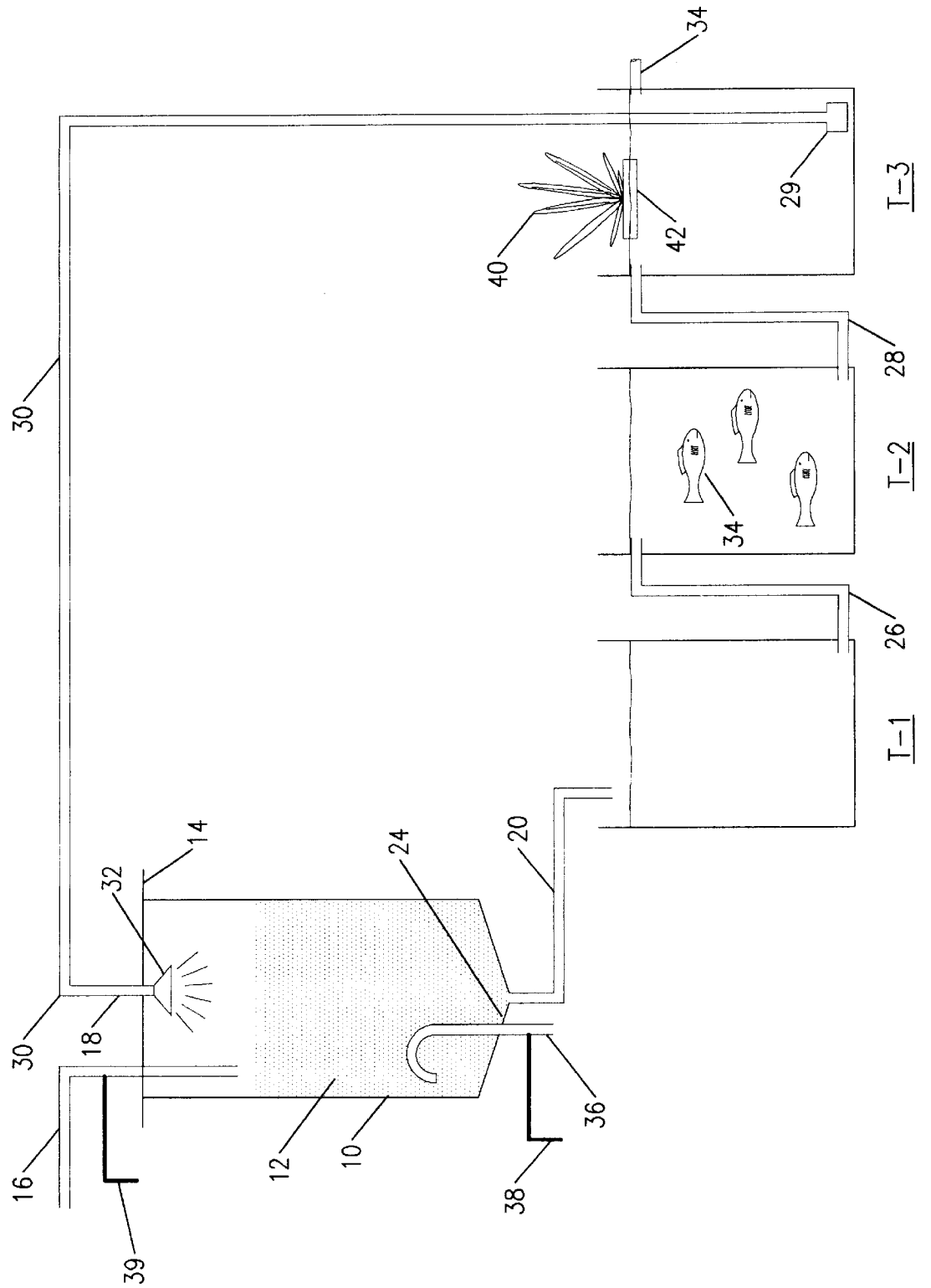

BIOLOGICAL TREATMENT SYSTEM FOR GASEOUS WASTE

BACKGROUND OF THE INVENTION

This invention relates to treatment of gaseous waste containing sulfur, or nitrogen compounds and more particularly relates to biological treatment systems for such gaseous waste.

It has been known that retention ponds could be built for holding aqueous waste materials containing undesirable materials and that to some extent such materials could be biologically metabolized and degraded by organisms within the pond. Such ponds have, however, been difficult to manage in that the undesirable materials (pollutants) could overwhelm many desirable life forms within the pond thus causing it to become biologically unstable. Additionally, metabolic products build up which are toxic to the metabolizing organisms. Removal of such toxic products was difficult and expensive and sometimes not even possible. Furthermore, to maintain a viable population of such organisms, nutrients often had to be supplied to the pond, especially when commonly occurring organisms were depleted or destroyed by toxic pollutants or metabolic products.

It has further been known to use bacteria as the organisms for metabolizing the undesirable waste materials. For example bacteria of the genus Thiobacillus is known to convert certain undesirable liquid and gaseous sulfur containing compounds such as hydrogen sulfide, mercaptans, inorganic sulfides, sulfites and carbon disulfide into more biologically inert metabolic by-product compounds containing $SO_4^=$. Unfortunately, most such $SO_4^=$ containing compounds are usually in the form of sulfuric acid which rapidly becomes toxic and must be neutralizer. Examples of such Thiobacillus bacteria include *Thiobacillus thiooxidans, Thiobacillus ferrooxidans, Thiobacillus thioparus, Thiobacillus denitrificans, Thiobacillus neapolitanus, Thiobacillus tepidarius, Thiobacillus versutus* and *Thiobacillus intermedius.* The bacteria *Thiobacillus denitrificans* is also known to metabolize undesirable nitrogen containing compounds.

Other bacteria are known which will metabolize alcohols, such as methanol and ethanol, methane, ketones, aldehydes, esters, ethers and carboxylic acids such as acetic and formic acids.

It has also been known to attempt to neutralize metabolically produced acids by throwing lime or ground limestone into a pond. Such an approach is messy, expensive and poses other problems associated with turbidity and floating of powdered material and usually does very little to offset the toxic effects of introduced pollutants.

Attempts have been made to biologically treat aqueous not gaseous effluents within columns containing limestone for purposes of neutralization. Nutrients must be added to and maintained within the waste stream in proper concentration which is exceedingly difficult. When undesirable microbial colonies become established they can overpower desirable organisms or shield the limestone from contact with acid within water passing through the column. When desirable microorganisms are replaced by other undesirable organisms or killed by improper nutrient balance or when the limestone must be replaced, desirable colonies must again be reestablished. This is often time consuming and difficult.

BRIEF DESCRIPTION OF THE DRAWING

The drawing shows a schematic view of a system in accordance with the present invention.

BRIEF DESCRIPTION OF THE INVENTION

The invention comprises a biological treatment system for removal of gaseous waste materials in a gaseous waste stream. The system comprises a column containing bacteria which break down said gaseous materials; a pond in series with the column containing life forms in addition to the bacteria, which life forms provide essential nutrients for the bacteria; a treatment bed containing a reaction medium for removing undesirable biological metabolic by-products from the action of said bacteria upon the gaseous waste materials; a fluid distribution means for circulating water between the pond, column and bed and a means for delivering the gaseous waste materials through the column before such waste materials reach the pond.

DETAILED DESCRIPTION OF THE INVENTION

"Biological treatment", as used herein, means to be ingested or eaten by a living organism and converted or metabolized by the organism to a more environmentally friendly or manageable substance.

"Waste material" means a biologically treatable material which is environmentally unfriendly and not in a form for practical use for any purpose.

"Environmentally unfriendly" means an undesirable organic or inorganic compound which in sufficient concentration may be toxic, noxious or carcinogenic to plant or animal life.

"Sulfur or nitrogen containing component" means a nitrogen or sulfur containing waste material. Examples of such compounds are hydrogen sulfide, carbon disulfide, sulfur dioxide, nitrous oxide, nitrogen dioxide, nitrogen pentoxide, and organic compounds which contain a $—SO_3$, $—NO_2$, $—SR$, or $—NR_2$ group where R is hydrogen or a carbon containing radical. Examples of such groups are mercapto, thioether and amino groups.

"Gaseous waste material" means a waste material which is in a gaseous or vapor phase at ambient conditions. Examples of such gaseous waste materials are carbon disulfide, hydrogen sulfide, nitrous oxide, nitric oxide, nitrogen dioxide, ammonia, sulfur dioxide, methane, methanol vapor, ethanol vapor, formaldehyde vapor, formic acid vapor, acetic acid vapor, sulfur trioxide and methyl mercaptan. Specific concentrations of such gaseous waste material may vary, e.g. from less than about 20 ppm to above about 5000 ppm. $CS_2$ or $H_2S$ gaseous waste material is usually from about 20 to about 5000 ppm in air.

"Column" as used herein means an elongated container containing a material (e.g. limestone or porous beads) which will act as a substrate for a microorganism which will metabolize a gaseous waste material, such as a sulfur or nitrogen containing component, as previously described. The column, in general, is designed to permit one or more fluids to flow through it. The column substrate material is kept damp by a liquid fluid, but is not immersed in liquid. When two fluids flow through the column, they may flow concurrent or counter current to each other. Usually pond water flows at a slow rate downwardly through the column while an air stream containing an environmentally undesirable sulfur or nitrogen containing gaseous component flows either upwardly or downwardly through the column.

"Pond", as used herein means a body of water having a depth of at least eight inches and a surface which is open to the air.

"Microorganism" as used herein means an organism, normally unicellular, not visible to the unaided eye. Microorganisms suitable for use in accordance with the present invention for metabolizing gaseous waste materials, e.g., sulfur or nitrogen containing components, include bacteria, algae, yeasts and molds. The most commonly used microorganisms for that purpose are bacteria.

"Additional life forms" means life forms in addition to the microorganisms which metabolize introduced undesirable waste materials, such as sulfur or nitrogen containing components. Such additional life forms may develop nutrients for the metabolizing microorganisms or may further metabolize by-products from the metabolizing microorganisms. Such additional life forms are aquatic or semi aquatic and include bacteria, protists, algae, fungi including yeasts and molds, higher plant life including bryophytes, pteridophytes and spermatophytes, polyps, hydra, mollusks, various worms, arthropods including crustaceans, including fairy shrimps and crawfish, insects, myriapods and spiders, fish, amphibians and reptiles.

"Bacteria" as used herein means one celled, prokaryote, chlorophyll free microorganisms which reproduce by simple cell division including the cocci, bacilli and spirilla forms thereof. Especially suitable for metabolic processes used in the present invention are the thiobacillus bacteria as previously described.

"Reaction medium" as used herein means a chemical material suitable for reducing or eliminating toxic effects of metabolic by-products. Such by-products are usually acidic in nature, e.g. sulfuric acid or nitric acid. A preferred reaction medium for neutralizing acidic by-products is calcium carbonate, usually in the form of limestone. Reaction media which can neutralize ammonium hydroxide include acidic salts such as magnesium sulfate, aluminum sulfate, aluminum chloride, zinc chloride, magnesium chloride or zinc sulfate, and mineral acids such as sulfuric acid, phosphoric acid or hydrochloric acid or organic acids such as acetic acid.

The fluid distribution means is usually a pump which removes water from the pond and sprays it on the column medium at the top of the column to keep the medium moist and provide nutrients. The means for delivering pollutants through the column is a fan or gas pump for causing flow of gas through the column.

All pollutants are not necessarily removed from one pass through the column. Some of the pollutants may be absorbed in the water within the column and circulated to the pond where further metabolism occurs.

In view of the discussion herein the advantages of the system become apparent. The highest concentration of pollutants initially pass through the column containing microorganisms which are not only resistant to the pollutants but feed upon them. The pond provides nutrients and keeps them in balance without significant human intervention and provides a reservoir for further metabolism of pollutants absorbed in recirculating water. In the event that the column must be shut down, recovery is rapid because the pond provides a reservoir of desirable microorganisms. The neutralizing bed may be separate or integral with the column and may be easily serviced without significant down time due to fast recovery as previously described.

The following examples serve to illustrate and not limit the present invention:

EXAMPLE 1

As shown in the drawing, a five foot long ten inch diameter fiberglass reinforced column 10, such as used in aquaculture, was filled with small limestone pieces 12 after sieving out fines through a ½ inch screen. The limestone provided calcium and magnesium carbonates for neutralization of $H_2SO_4$ produced in the process and thus maintains an essentially neutral pH. The limestone also provides carbon for bacterial reproduction and inorganic micronutrients needed to support healthy bacterial growth. The column was covered with a fiberglass plate 14 through which two stainless steel pipes 16 and 18 were inserted for gas and water supply. Bottom outlet pipe 20 was attached to the bottom 24 of column 10.

The column 10 was placed on a raised platform, not shown, for accommodation of bottom pipe 20 and for gravity flow of liquid effluent into subsequent tanks designated as T-1, T-2 and T-3 filled with deionized water which were exposed to sunlight. Alternatively a pump can be used to transfer water. Tank T-2 acted as a pond. Liquid outlet pipe 20 from the column was connected to tank T-1 near its top. The tanks all had dimensions of 24 inches long by 17 inches wide by 19 inches deep. An outlet 26 near the bottom of T-1 flowed into tank T-2. An outlet 28 from T-2 flowed into T-3 from where water was pumped back to the top of column 10 by means of pump 29, conduit 30 and nozzle 32. Several live fish 34 variously selected from goldfish, tilapia or catfish were introduced into tank T-2 and provided organic nutrients for the bacteria, especially organic nitrogen.

Effluent air from a viscose plant containing $CS_2$ and $H_2S$ gases was introduced into the top of the column 10 through inlet 16 and out through an inverted "J" fitting 36 at bottom 24 to prevent water from entering chromatograph line 38. Both the influent and effluent gases were connected by lines 38 and 39 through an automatic gas sampling device to a gas chromatograph for monitoring of concentration of $CS_2$ and $H_2S$.

The limestone containing column 10 was inoculated with filtered mud slurries from the bank of a small creek near a viscose plant, from a lagoon bank where plant effluents were treated, from a sulfur spring fed channel at French Lick, Ind., and with cultured thiobacillus bacteria from mud samples obtained near a viscose plant. Within a month destruction efficiency for about 20 parts per million (ppm) $H_2S$ and about 20 ppm $CS_2$, went to 100% for $H_2S$ and 90–95% for $CS_2$.

The system was also run with plants 40 and fish 34 in T-1 and T-3. For example bitter melon, jalapeno pepper, and Malabar lettuce were grown in floating type planters 42. In all cases the system ran with almost no intervention. No artificial nutrients were provided for the bacteria and no neutralizing caustic was introduced. Initially the fish were fed with fish food which was stopped when the tanks developed algae growth.

EXAMPLE 2

The above example was repeated on a larger scale using a 30 inch by 40 inch high limestone bed and 47×25×18 inch tanks. Air flow was increased to 70 to 80 liters per minute without adversely affecting the destruction efficiency of the $H_2S$ and $CS_2$. When sulfate concentration, usually in the form of magnesium sulfate, became too high a portion of the water was replaced and the system continued to efficiently run with essentially no interruption. The system was run for several months with no problems.

What is claimed is:

1. A biological treatment system for removal of gaseous waste materials from a gas stream comprising a column containing microorganisms which break down said materials; a pond in series with the column containing life forms in addition to the microorganisms in the column, which life forms provide essential nutrients for the microorganisms in the column; a treatment bed containing a reaction medium for removing undesirable biological metabolic by-products from the action of said microorganisms upon said waste materials; a fluid distribution means for circulating water between the pond, column and bed and a means for delivering the waste materials through the column before such gaseous waste materials reach the pond.

2. The treatment system of claim 1 wherein the gaseous waste materials comprise sulfur or nitrogen containing components.

3. The treatment system of claim 2 wherein the treatment bed is located within the column, the microorganisms are bacteria and the treatment bed provides a surface for growth of the bacteria.

4. A method of treating a gaseous stream containing sulfur or nitrogen containing gaseous waste materials which comprises introducing said stream into the system of claim 3.

5. The biological system of claim 2 wherein limestone is contained in a bed within the column.

6. A method of treating a gaseous stream containing sulfur or nitrogen containing gaseous waste materials which comprises introducing said stream into the system of claim 5.

7. The treatment system of claim 1 wherein the additional life forms comprise a mixture of plant and animal life.

8. The system of claim 7 wherein the animals comprise fish.

9. A method of treating a gaseous stream containing sulfur or nitrogen containing gaseous waste materials which comprises introducing said stream into the system of claim 8.

10. A method of treating a gaseous stream containing sulfur or nitrogen containing gaseous waste materials which comprises introducing said stream into the system of claim 7.

11. The treatment system of claim 1 wherein means for delivering the gaseous waste materials to the column comprises a turbine for transfer of gases, containing the waste materials, to the column.

12. The system of claim 11 wherein the pollutants comprise hydrogen sulfide and carbon disulfide, the microorganisms are thiobacillus bacteria and the undesirable metabolic product is sulfuric acid.

13. A method of treating a gaseous stream containing sulfur or nitrogen containing gaseous waste materials which comprises introducing said stream into the system of claim 12.

14. A method of treating a gaseous stream containing sulfur or nitrogen containing gaseous waste materials which comprises introducing said stream into the system of claim 11.

15. The treatment system of claim 1 wherein the undesirable metabolic products are acids and the bed is a bed containing limestone upon which water from the pond is sprayed.

16. A method of treating a gaseous stream containing sulfur or nitrogen containing gaseous waste materials which comprises introducing said stream into the system of claim 15.

17. The system of claim 1 containing bacteria for the treatment of a gaseous waste material comprising a gaseous stream comprising air containing between 20 and 5000 parts per million per volume of carbon disulfide.

18. A method of treating a gaseous stream containing sulfur or nitrogen containing gaseous waste materials which comprises introducing said stream into the system of claim 17.

19. The system of claim 1 containing bacteria for the treatment of a gaseous waste material comprising an aqueous stream containing between 20 and 5000 parts per million per volume of hydrogen sulfide.

20. A method of treating a gaseous stream containing sulfur or nitrogen containing gaseous waste materials which comprises introducing said stream into the system of claim 19.

21. The system of claim 1 wherein bacteria are present for treatment of a gaseous waste material containing both hydrogen sulfide and carbon disulfide.

22. A method of treating a gaseous stream containing sulfur or nitrogen containing gaseous waste materials which comprises introducing said stream into the system of claim 21.

23. A method of treating a gaseous stream containing a mixture of hydrogen sulfide and carbon disulfide pollutants which comprises introducing said stream into the system of claim 21.

24. A method of treating a gaseous stream containing sulfur or nitrogen containing gaseous waste materials which comprises introducing said stream into the system of claim 1.

25. A method of treating a gaseous stream containing a mixture of hydrogen sulfide and carbon disulfide pollutants which comprises introducing said stream into the system of claim 1.

* * * * *